United States Patent [19]

Boog et al.

[11] Patent Number: 4,530,378
[45] Date of Patent: Jul. 23, 1985

[54] COMPOSITE TUBULAR BODY

[75] Inventors: Manfred Boog, Rodenbach; Werner Jakob, Gründau, both of Fed. Rep. of Germany

[73] Assignee: Heraeus Quarzschmelze GmbH, Hanau, Fed. Rep. of Germany

[21] Appl. No.: 403,398

[22] Filed: Jul. 30, 1982

[30] Foreign Application Priority Data

Oct. 22, 1981 [DE] Fed. Rep. of Germany ....... 3141919

[51] Int. Cl.³ .............................................. F16L 9/22
[52] U.S. Cl. .................................. 138/109; 138/155; 138/177; 138/178; 428/36; 65/DIG. 9; 65/DIG. 8; 285/DIG. 12
[58] Field of Search ............... 138/109, 155, 137, 141, 138/140, 172, 177, 178, DIG. 2; 285/DIG. 12; 428/35, 36; 65/60.8, DIG. 8, DIG. 9

[56] References Cited

U.S. PATENT DOCUMENTS

| | | | |
|---|---|---|---|
| 2,149,133 | 2/1939 | Cohn | 285/DIG. 12 X |
| 3,362,435 | 1/1968 | Meyer | 138/178 |
| 3,544,281 | 12/1970 | Phillips | 138/109 X |
| 3,882,901 | 5/1975 | Seiler et al. | 138/109 X |
| 3,927,697 | 12/1975 | Baumler et al. | 138/177 |

FOREIGN PATENT DOCUMENTS 330943 6/1930 United Kingdom .

OTHER PUBLICATIONS

Heraeus Quarzschmelze Q-B 3/113 "Quarzglas für die Halbleitertechnik" (Quartz Glass for the Semi-Conductor Technology (West Germany)–1979.

Primary Examiner—James E. Bryant, III
Attorney, Agent, or Firm—Sprung Horn Kramer & Woods

[57] ABSTRACT

Tubular body of fused quartz and quartz glass with a seamless transition from the fused-quartz zone to the quartz-glass zone. The body is manufactured continuously in a hollow rotating metal cylinder by disposing silica against the rotating mold and adding thereto, such as in an annular zone therein, rock crystal or synthetic silicon dioxide and fusing the rock crystal or synthetic silicon dioxide to the fused silica whereby no seam is formed.

15 Claims, 4 Drawing Figures

COMPOSITE TUBULAR BODY

BACKGROUND OF THE INVENTION

1. Field of the Invention

This invention relates to a composite tubular body with at least one open end, at least one annular zone of fused quartz, and at least one annular zone of quartz glass, with the fused quartz produced essentially from quartz sands and the quartz glass from rock crystal or synthetic silicon dioxide. This invention also relates to a method of manufacturing a composite tubular body of the type described.

2. Discussion of Prior Art

Composite tubular bodies that are built up of separately manufactured parts are known (Heraeus Quarzschmelze Prospectus Q-B 3/113 [1979]). They consist of parts manufactured from fused quartz by the known process disclosed in German Pat. No. 543 957 along with at least one separately manufactured part of quartz glass produced from rock crystal or synthetic silicon dioxide. Since the fused quartz is obtained mainly from quartz sands, it is not completely pure and contains a larger or smaller amount of tiny air bubbles, which makes this fusion product opaque.

Furthermore, since these separately manufactured parts of fused quartz and quartz glass are fused together and finally tempered into a relaxation state, the fusion seam presents several problems. It has low mechanical strength. It prevents the walls from being as strong as desired. The length of the seam restricts the outer diameter of the tubular body to 300 mm. Manufacturing tolerances result in a bead along the site of the seam inside the tube that must, along with the seam itself, be ground down. This is detrimental to the glaze that develops inside the body as it is being manufactured, which is a special drawback when aggressive materials are employed, because they can penetrate into the resultingly porous wall. The necessity of fusing the parts together and then tempering and grinding the body make this method of manufacture very expensive.

It has become desirable, therefore, to provide a composite tubular body which is transparent as well as translucent, which has high mechanical strength and is not characterized by a fusion seam or bead at the site of a seam inside the tube.

SUMMARY OF INVENTION

The desideratum above is provided by a composite tubular body that is mechanicaly stable, that can be manufactured without subsequent processing, such as fusing the parts together or tempering and grinding the inside, and that can be larger than known examples.

This objective is attained, in accordance with the invention, by a composite tubular body of the type initially described because both zones are fused together without a seam. It is practical for at least one end zone of the composite body to be manufactured of quartz glass and for at least one free end to be flanged. Its outside diameter is preferably more than 300 mm and its walls 10 to 25 mm thick.

One method of manufacturing a composite tubular body in accordance with the invention comprises charging a hollow mold that is rotating around its longitudinal axis with a layer of quartz sand that covers its interior surface, smoothing the uncovered interior surface of the layer of quartz sand, removing an annular zone from the layer of quartz sand while the mold is kept rotating, filling the cavity with granulated rock crystal or granulated synthetic silicon dioxide, fusing the materials from the inside out while the mold is kept rotating, cooling the resulting body, and removing it from the form.

Advantageously, the composite tubular body produced in accordance with the invention has a seamless, glazed transition from fused quartz to quartz glass that requires no fusion bonding or subsequent thermal treatment. One particular advantage is that the seamless glaze eliminates diffusion, especially by aggressive chemicals. Composite tubular bodies, in accordance with the invention, having a free end of quartz glass can have a homogeneous sealing face that allows no diffusion. This composite body can be manufactured in one piece and at low cost even though its tubular diameter is longer and its wall thicker.

BRIEF DESCRIPTION OF DRAWING

Referring to the drawings.

DESCRIPTION OF SPECIFIC EMBODIMENTS

Figure 1:
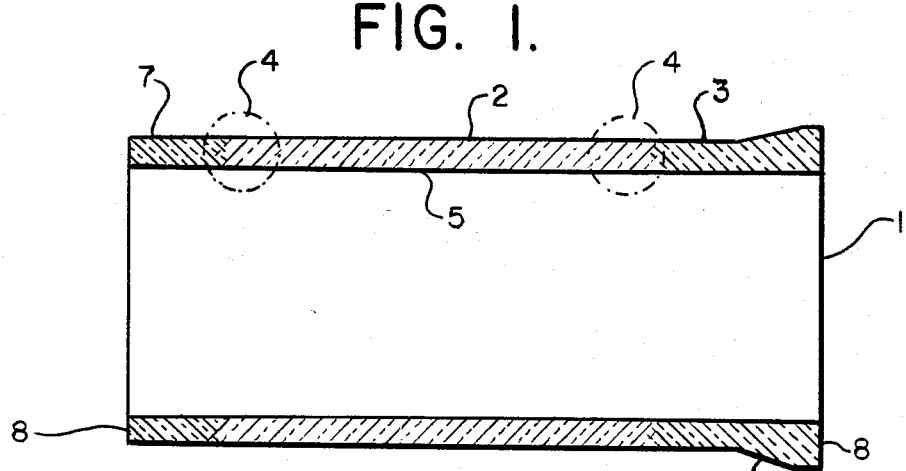
FIG. 1 is a cross-section of one embodiment of a composite tube in accordance with the invention.

Referring to the drawings, the composite tube in FIG. 1 comprises a zone 2 of fused quartz that merges directly into zones 3 and 7 of quartz glass. Zone 3 may, for example, have a flange 6 while zone 7 is normally strictly cylindrical. The transition zones 4 from fused quartz to quartz glass is gradual and exhibits no boundary or seam. The inside 5 of the wall is a glazed and continuous coating with no bead. The sealing faces 8 are of homogeneous, non-porous quartz glass.

Figure 2:
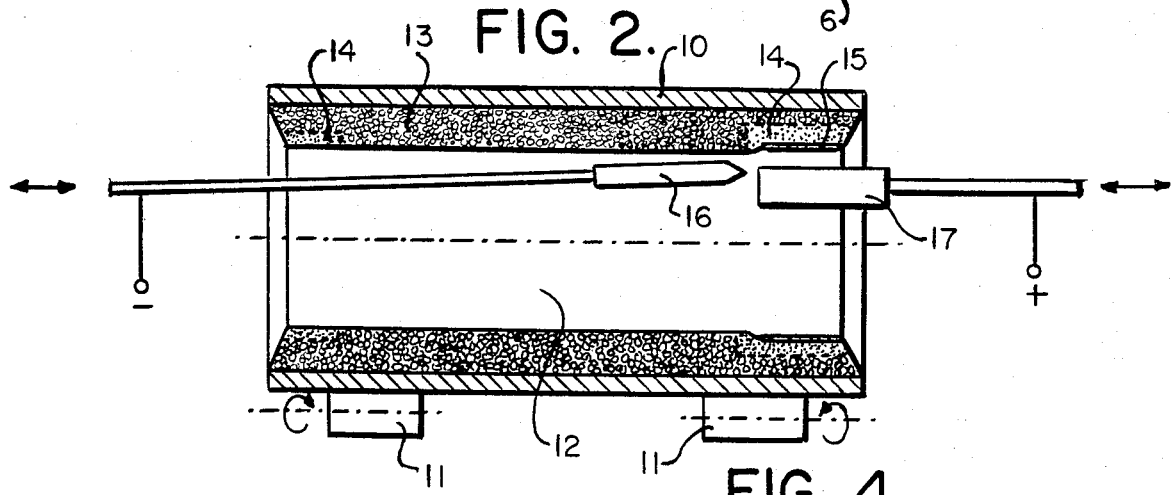
FIG. 2 is a schematic cross-section of the composite tube illustrated in FIG. 1 at one instant of the manufacturing process.

As demonstrated in FIG. 2, a composite tube as in FIG. 1 is manufactured in a hollow, rotating metal cylinder 10 resting against power rollers 11. The centrifugal force of the rotating cylinder holds the charge, which may be quartz sand 13 and granules 14 of rock crystal or granulated synthetic silicon dioxide, against the cylinder wall. A zone 15 is represented as already fused into quartz glass. The volume of the empty central space 12 determines the inside diameter of the tube being manufactured.

FIG. 2 also illustrates two electrodes 16 and 17, which may move in the direction indicated by the arrows and which are electrically connected to a source of direct current. The current of the arc between electrodes 16 and 17 and the rate at which they travel through the tube can be varied to obtain a temperature that is optimal for fusing the charge. Continuous fusing produces a non-porous glaze on the inside of the wall of the tube.

Figure 3:
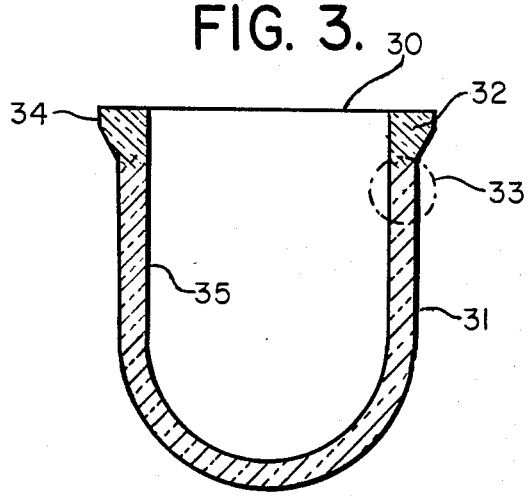
FIG. 3 illustrates a composite body closed at one end.

FIG. 3 illustrates a composite body 30 that is closed at one end and that exhibits a zone 31 of fused quartz, a single zone 32 of quartz glass, and a seamless transition 33 between them. In this case there is a flange-like ridge 34 around the open end. The inside surface 35 of the hollow body is a glazed coating.

Figure 4:
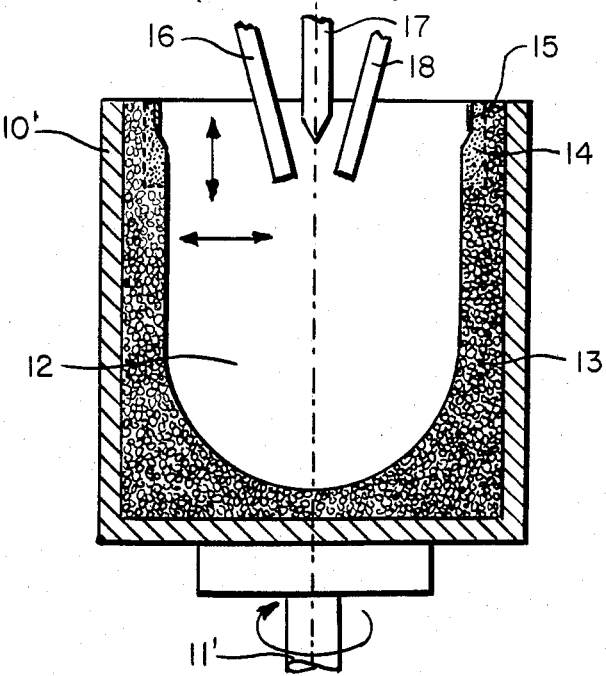
FIG. 4 shows the same body as that of FIG. 3 at one instant of the manufacturing process.

As will be evident from FIG. 4, a composite body of the type illustrated in FIG. 3 is manufactured by a process similar to that by which the body in FIG. 2 is manufactured. In contrast to FIG. 2, however, the process of manufacturing a composite body that is closed at one end as demonostrated in FIG. 4 is carried out vertically with a pot-like metal mold 10′ mounted on a rotating turntable 11′. In this case, three electrodes 16, 17 and 18, which may move in the directions indicated by the arrows, are employed.

The invention is not limited to the embodiments specified, and slight modifications in design, materials, and the relations between the components are possible without departing from its scope. An additional continuous inner layer of fused quartz may be employed, for example.

The transition zone formed at the interface of the annular zone of fused quartz and the annular zone of quartz glass generally has a length of at least 10 mm and usually up to 40 mm, preferably 30 to 50 mm.

Generally speaking, the diameter of the tube is less than 700 mm and is preferably in the range of 150 to 50 mm. The wall thickness of the tubular body is at least 10 mm and generally up to 25 mm with a wall thickness of 12 to 18 mm being preferred.

The glazed coating formed on the inside of the tube generally has a thickness of at least 2 mm and generally overlies the annular zone of fused quartz, the annular zone of quartz glass and the transition zone disposed therebetween.

What is claimed is:

1. A composite tubular body with at least one open end, comprising at least one annular zone of fused quartz and at least of one annular zone of quartz glass, said fused quartz produced essentially from quartz sand and said quartz glass from rock crystal or synthetic silicon dioxide, at least one of said annular zones of fused quartz fused at its end to one end of said annular zone of quartz glass to define a transition zone therebetween having a length of at least 10 mm and a diameter of at least 150 mm.

2. A composite tubular body according to claim 1, wherein at least one end zone of the composite body is manufactured of quartz glass.

3. A composite tubular body according to claim 1, wherein at least one free end is flanged.

4. A composite tubular body according to claim 1, wherein the outside diameter of said body is more than 300 mm and its walls 10 to 25 mm thick.

5. A composite tubular body according to claim 1, wherein said transition zone is of a composition resulting from the fusing of the compositions of said annular zone of fused quartz and said annular zone of quartz glass.

6. A composite tubular body according to claim 1, wherein said tubular body is open at both ends.

7. A composite tubular body according to claim 1, wherein said tubular body is closed at one end.

8. A composite tubular body according to claim 1, wherein along the inside wall of said transition zone there is a glazed coating.

9. A composite tubular body according to claim 8, wherein said glazed coating overlies said annular zone of fused quartz and said annular zone of quartz glass.

10. A composite tubular body according to claim 1, wherein the annular zone of said fused quartz is fused to the annular zone of quartz glass without a bead.

11. A composite tubular body according to claim 1, wherein there is no bead at the point where said annular zone of fused quartz abuts and is fused to said annular zone of quartz glass.

12. A composite tubular body according to claim 1, wherein said transition zone has a length of at least 10 mm and up to 50 mm.

13. A composite tubular body according to claim 12, wherein said transition zone has a length of 30 to 50 mm.

14. A composite tubular body according to claim 1, wherein the diameter of the tube is less than 700 mm.

15. A composite tubular body according to claim 1, wherein there is a glazed coating of a thickness of at least 2 mm overlying the annular zone of fused quartz, the annular zone of quartz glass and the transition zone disposed therebetween.

* * * * *